United States Patent Office 3,165,570
Patented Jan. 12, 1965

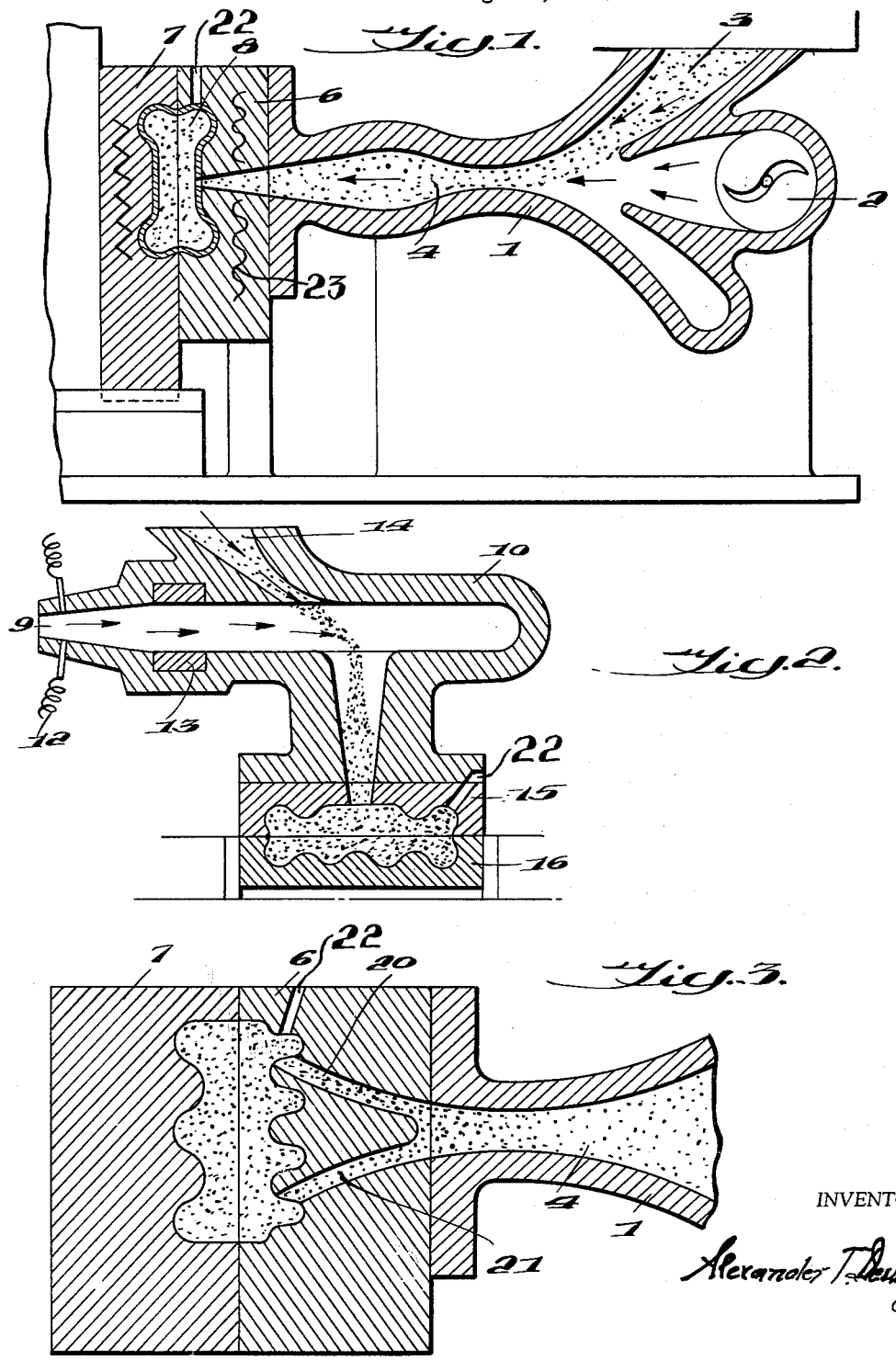

3,165,570
REFRACTORY POWDER INJECTION, PROCESS
AND APPARATUS
Alexander T. Deutsch, 1721 19th St. NW.,
Washington, D.C.
Filed Aug. 22, 1962, Ser. No. 221,395
10 Claims. (Cl. 264—329)

This application is a continuation-in-part of my copending application Serial No. 770,829, filed Oct. 30, 1958, now abandoned, and relates to a process and apparatus for molding particulate materials, derived from refractory metal, or ceramic, particles or their alloys or compositions, by blowing them under great velocity into an irradiated mold, die or the like, depositing them therein, until the mold is filled and the particulate material diffuses to a strong and compact body. In this way various shapes and structures can be quickly and efficiently produced. The powders can be cold or selectively warmed by temperature control, which is of importance. In my prior applications, Serial No. 603,421, filed Aug. 10, 1956 (now abandoned), and Serial No. 684,959, filed Sept. 19, 1957, a continuation-in-part thereof and now Patent No. 2,902,364, patented Sept. 1, 1959 (of which the said copending application 770,829 was a continuation-in-part and now the present application in turn is also a continuation-in-part), I have disclosed several heating means for particulate particles to be formed and shaped by impact at controlled temperature.

Powders of very fine mesh sized down to $1/10000$ of an inch diameter are advantageously blown directly or with a carrier such as a fluid, a plasma, a gas, or any other qualified material. This carrier fluid carries the particulate material along, at velocities of about 90 feet per second, provided by single or repeated shocks from mechanical, pneumatic or electromagnetic power sources or any other accelerating and pressure-increasing means which provides the impact necessary to bond fused and diffused deposits.

One of the objects of this invention is to provide a simple and quick-working process to produce high quality parts and structures.

It is an object of this invention to expand the principle of impact-forming according to my prior Patent No. 2,902,364, issued Sept. 1, 1959, in the practice of my invention by proper selection of grain-size, type of powders, or the like, impacting force, and heat or radiation.

In addition, harder and softer materials may be combined within the limits of grain-size and grain types. The heat-producing source for the channels or in the molds may be provided by any heat source or by electro-magnetic or by high frequency heating units including infrared fields. The temperatures used may promote the molten state of the particles or can stop short of melting it. When the particles are heated to a temperature below the recrystallization point of the softest, the molded product will have good tensile strength, hardness and ductility.

The process of my invention may be carried out in several ways. It is possible to accelerate and inject the various mixed powders directly into the mold, for example by using centrifugal force as a source of particle acceleration. A preferred way is to use a carrier-fluid, as a gas, to transport the particulate material into the mold. This gas, such as air, can be injected into the mold impelled by an energy source, such as a compressor, first into a venturi type channel to increase the velocity, and from there into the mold. The powder carried by the highly accelerated and heated gas-stream into the mold is deposited and fused therein by the impact of the resulting force and by the heat radiation, applied in the channel and in the mold. Escapes are provided for venting of the gas from the mold after the deposition of the particles.

Another way the invention may be carried out is to accelerate an ionized gas in a magnetic field within a channel system as provided by any type of magnetic bottle, for example the known T-shaped pinch-effect tube system. The ionized carrier gas is squeezed in the tube shaft by the pinch effect with resulting high pressure in the direction of the longer leg of the said T tube. The powder drops or may be injected into this gas stream, which carries it into the mold under tremendous pressure and heat. The gas may come from any source, as a gas-bomb, a compressor, or a natural source. Diffusion of the particulate material in the mold is achieved by impact-pressure and by radiation.

FIGURE 1 shows the direct injection of a gas stream into a venturi-throat channel and from there into a mold. FIGURE 2 illustrates the ionized and magnetized fluid way of accelerating the particles, while FIGURE 3 shows a venturi-type injector, with several arms, for better distribution, and for reaching into the fixed part of a mold. The embodiment of FIG. 3 is similar to that used in the injection-molding presses for thermo-plastic materials.

Referring to FIG. 1, there is shown a containing wall 1 enclosing a channel 4, a power source 2 which is shown here as an air compressor, a gas-turbine, or other source of condensed gas. The powder is sucked into the system by way of nozzle 3 passing into a venturi-throat channel into which the carrier-fluid is injected by the compressor. The venturi-throat channel 4 draws the powder from the nozzle 3 by suction therein. The mold base 6 is fixed, while 7 represents the sliding part of the mold, and 8 is the mold space having molding powder deposited therein. Any suitable venting means 22 is provided, as a small opening in the mold to allow the carrier gas to escape from the mold. The channel 4 and mold 7 can be heated or irradiated by any known temperature control means, shown as 23. This process allows the production of fine- or of large-grain parts of great exactness and predetermined quality.

FIGURE 2 shows a carrier-fluid 9, as a suitable gas, moving within a T-shaped channel of the container tube 10, entering it at the nozzle 11. Electrodes 12 are provided to ionize the gas, and an electro-magnet 13 creates a magnetic field which accelerates the ionized gas, partially heats it, and squeezes it through the axes of the T-shaped tube. Great pressure is created in the tube 10 so when the powder enters by suction at 14 it streams through the nozzle and is carried into a partitioned mold having a fixed part 15 and a sliding part 16. The mold receives the powder which fuses as a consequence of the tremendous impact and radiation as described in my prior Patent 2,902,364.

FIGURE 3 illustrates another embodiment of the injector shown in FIG. 1, whereby the gas enters the mold through several channels 20 and 21.

The new apparatus of this invention may be built as a large machine or as a hand tool. It is essential to the process, however, that the impact under which the particulate material hits the hold or die, plus the radiation to which it is exposed, creates diffusional interaction between the powder particles. The formed products may be subsequently heat treated, if desired.

Instead of a T-shaped magnetic bottle, any other form to accelerate and heat up the carrier gas may be used.

I claim:
1. The method of impact forming of refractory particles in a mold comprising suspending said particles in a carrier gas, imparting an elevated velocity and tempera- ture to said gaseous suspension of particles, to convert said suspension into a plasma, passing said suspension as a jet into a closed, two-part vented mold as a continuous stream and impacting the particles one upon the other to cohere and adhere each particle into a matrix filling the space within said mold and forming a composite molded article.

2. The method as defined in claim 1 wherein the refractory particles comprise alloyed refractory metals.

3. The method as defined in claim 1 wherein the refractory particles comprise ceramic materials.

4. The method as defined in claim 1 wherein the suspension of particles in the gas is heated and accelerated in passage to said mold as a plasma.

5. The method as defined in claim 1 wherein the refractory particles comprise a mixture of metal and ceramic materials.

6. The method as defined in claim 1 wherein the temperature and velocity of the particles suspended in the gaseous carrier is induced in situ in the moving stream by at least partially ionizing the carrier gas and by passing said stream through a magnetic field.

7. The method as defined in claim 1 wherein the particles to be formed are elements of the group consisting of aluminum, copper, zinc, nickel, iron, chromium, molybdenum, titanium, tungsten, zirconium, columbium, beryllum, vanadium, manganese and uranium, silicon, germanium, and alloys containing said metals.

8. Molding apparatus comprising in combination an enclosed split mold comprising a fixed mold element and a sliding mold element, a vent in said mold, a duct communicating with said mold adapted to carry refractory particles suspended in a gaseous carrier as a stream for high velocity impact molding against the walls of said mold and impacted particles therein to form a coherent molded body, means for passing a gas into said duct leading to said mold, electrical and magnetic means associated with said gas inlet means passing to said duct for converting said stream into a plasma and means for inducting and entraining refractory particles into said stream as a suspension therein, thereby heating and accelerating said particles therein for molding.

9. The method as defined in claim 1 wherein the particles suspended in said plasma are molten.

10. The method as defined in claim 1 where the particles suspended in the plasma are solid.

References Cited by the Examiner
UNITED STATES PATENTS

| | | |
|---|---|---|
| 1,128,059 | 2/15 | Schoop. |
| 2,047,124 | 7/36 | Cutts et al _____ 22—202 X |
| 2,133,027 | 10/38 | Honig _____ 18—5 |
| 2,611,939 | 9/52 | Hansberg _____ 22—10 |
| 2,714,563 | 8/55 | Poorman et al. _____ 18—25 X |
| 2,768,279 | 10/56 | Rava _____ 18—47.1 |
| 2,770,708 | 11/56 | Briggs _____ 219—75 |
| 2,990,601 | 7/61 | Wagner _____ 264—309 X |

ALEXANDER H. BRODMERKEL, *Primary Examiner.*

MICHAEL V. BRINDISI, MORRIS LIEBMAN, *Examiners.*